US012603529B2

(12) United States Patent　　　(10) Patent No.:　US 12,603,529 B2
Park et al.　　　　　　　　　　　　(45) Date of Patent:　　Apr. 14, 2026

(54) APPARATUS AND METHOD FOR PERFORMING WIRELESS POWER TRANSMISSION ON BASIS OF FOREIGN MATERIAL DETECTION

(71) Applicant: LG Electronics Inc., Seoul (KR)

(72) Inventors: Yongcheol Park, Seoul (KR); Kyunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/910,940

(22) Filed: Oct. 9, 2024

(65) Prior Publication Data

US 2025/0038579 A1　　Jan. 30, 2025

Related U.S. Application Data

(63) Continuation of application No. 18/229,819, filed on Aug. 3, 2023, now Pat. No. 12,126,187, which is a continuation of application No. 17/497,266, filed on Oct. 8, 2021, now Pat. No. 11,757,310, which is a continuation of application No. 16/990,466, filed on Aug. 11, 2020, now Pat. No. 11,146,120, which is a (Continued)

(30) Foreign Application Priority Data

Aug. 1, 2018　(KR) ........................ 10-2018-0090089

(51) Int. Cl.
　　*H02J 50/60*　　　(2016.01)
　　*H02J 50/10*　　　(2016.01)
　　*H02J 50/40*　　　(2016.01)
　　*H02J 50/80*　　　(2016.01)

(52) U.S. Cl.
　　CPC .............. *H02J 50/60* (2016.02); *H02J 50/10* (2016.02); *H02J 50/80* (2016.02); *H02J 50/40* (2016.02)

(58) Field of Classification Search
CPC .. H02J 50/60; H02J 50/80; H02J 50/10; H02J 50/40
See application file for complete search history.

(56) References Cited

FOREIGN PATENT DOCUMENTS

WO　　2018/124669 A1　7/2018

OTHER PUBLICATIONS

Extended European Search Report in European Appln. No. 24206833.6, mailed on Mar. 10, 2025, 8 pages.

(Continued)

*Primary Examiner* — Carlos Amaya

(74) *Attorney, Agent, or Firm* — Fish & Richardson P.C.

(57) ABSTRACT

The present specification provides a wireless power reception apparatus comprising: a power pick-up unit configured to receive wireless power from a wireless power transmission apparatus by magnetic coupling with the wireless power transmission apparatus and convert an AC signal generated by the wireless power into a DC signal; a communication/control unit configured to receive the DC signal from the power pick-up unit and control the wireless power; and a load configured to receive the DC signal from the power pick-up unit. When foreign material is detected before power transmission, wireless power transmission is sustained on the basis of a safe basic power profile of 5 W or less, without interrupting power transmission, and thus, a charging delay can be prevented and the accuracy and reliability of detection of foreign material can be increased despite individual characteristics of the wireless power reception apparatus.

5 Claims, 19 Drawing Sheets

Related U.S. Application Data continuation of application No. PCT/KR2019/009403, filed on Jul. 29, 2019.

(56) References Cited

OTHER PUBLICATIONS

Wireless Power Consortium, "The Qi Wireless Power Transfer System—Power Class 0 Specification," Parts 1 and 2: Interface Definitions, Version 1.2.4, Feb. 2018, 179 pages.

| | b7 | b6 | b5 | b4 | b3 | b2 | b1 | b0 |
|---|---|---|---|---|---|---|---|---|
| Byte 0 | Application Profile | | | | | | | |
| Byte 1 | Version | | | | | | | |
| Byte 2-N-1 | Profile-specific data | | | | | | | |

Figure 6:
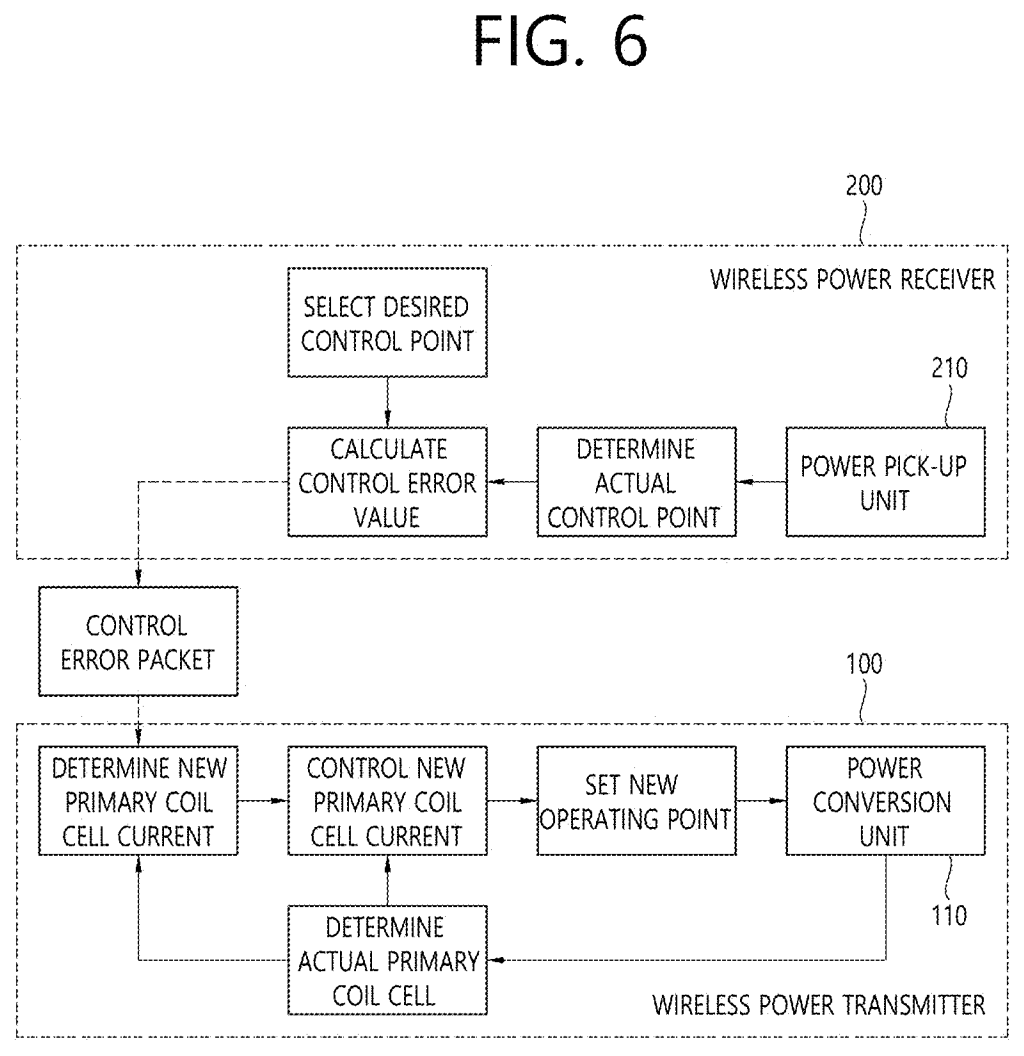

WIRELESS POWER RECEIVER 200

210

POWER PICK-UP UNIT

DETERMINE ACTUAL CONTROL POINT

SELECT DESIRED CONTROL POINT

CALCULATE CONTROL ERROR VALUE

CONTROL ERROR PACKET

DETERMINE NEW PRIMARY COIL CELL CURRENT

CONTROL NEW PRIMARY COIL CELL CURRENT

DETERMINE ACTUAL PRIMARY COIL CELL

SET NEW OPERATING POINT

POWER CONVERSION UNIT 110

WIRELESS POWER TRANSMITTER 100

Figure 9:
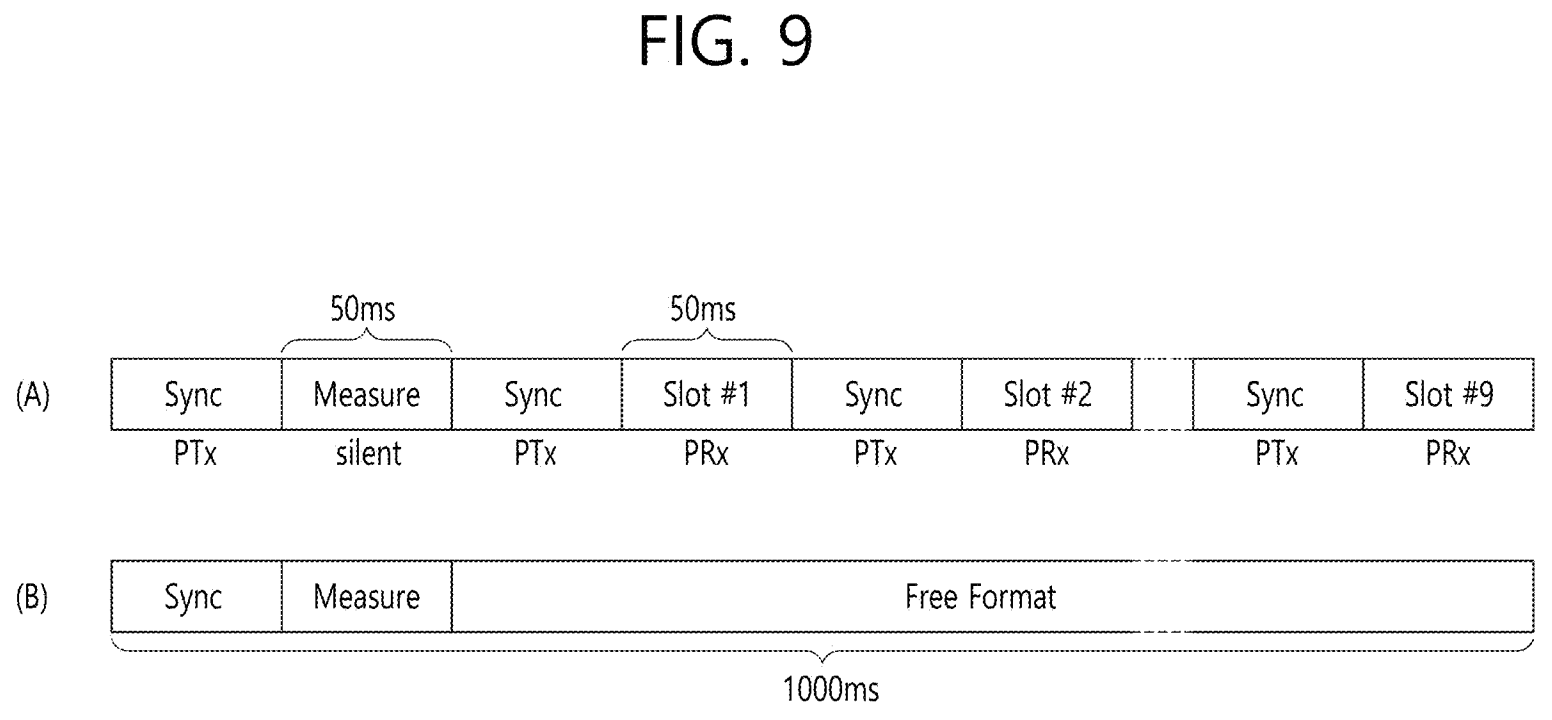

| Sync | Measure | Sync | Slot #1 | Sync | Slot #2 | | Sync | Slot #9 |
|------|---------|------|---------|------|---------|--|------|---------|
| PTx | silent | PTx | PRx | PTx | PRx | | PTx | PRx |

50ms — 50ms (B)

| Sync | Measure | Free Format |
|------|---------|-------------|

Figure 10:
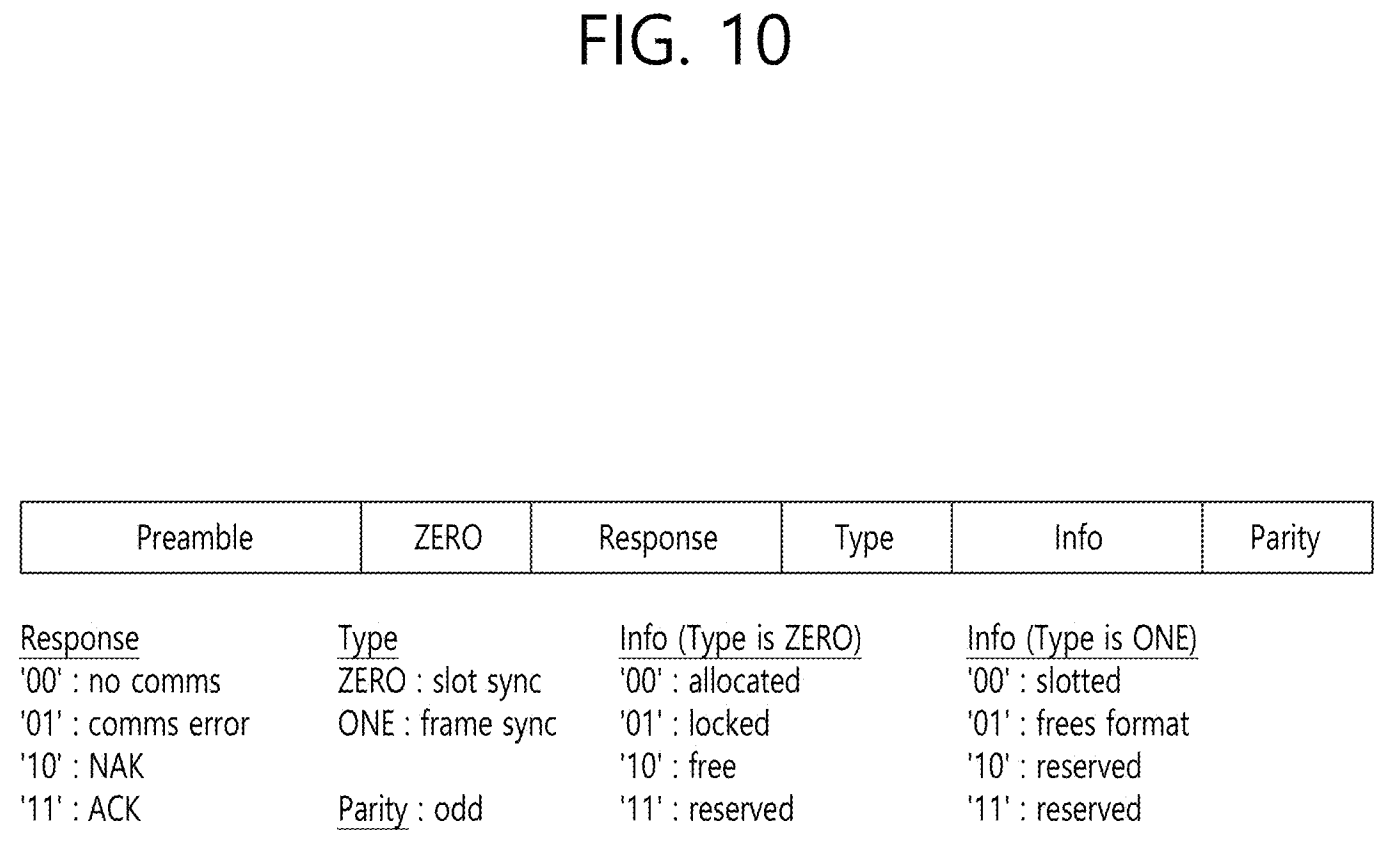

| Preamble | ZERO | Response | Type | Info | Parity |
|---|---|---|---|---|---|

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

FIG. 13

| | $B_7$ | $B_6$ | $B_5$ | $B_4$ | $B_3$ | $B_2$ | $B_1$ | $B_0$ |
|---|---|---|---|---|---|---|---|---|
| $B_0$ | Reserved | | | | | | Type | |
| $B_1$ | FOD Support Data | | | | | | | |

1

APPARATUS AND METHOD FOR PERFORMING WIRELESS POWER TRANSMISSION ON BASIS OF FOREIGN MATERIAL DETECTION

CROSS-REFERENCE TO RELATED APPLICATIONS

This application is a continuation of U.S. application Ser. No. 18/229,819, filed on Aug. 3, 2023, which is a continuation of U.S. application Ser. No. 17/497,266, filed on Oct. 8, 2021, now U.S. Pat. No. 11,757,310, which is a continuation of U.S. application Ser. No. 16/990,466, filed on Aug. 11, 2020, now U.S. Pat. No. 11,146,120, which is a continuation pursuant to 35 U.S.C. § 119(e) of International Application No. PCT/KR2019/009403, with an international filing date of Jul. 29, 2019, which claims the benefit of Korean Patent Application No. 10-2018-0090089 filed on Aug. 1, 2018, the contents of which are all hereby incorporated by reference herein in their entirety.

BACKGROUND OF THE DISCLOSURE

Field of the Disclosure

The present disclosure relates to a wireless power transmitting system and, more particularly, to an apparatus and method for performing wireless power transmission based on foreign object detection.

Related Art

Wireless power transmission technology is a technology designed for wirelessly delivering power between a power source and an electronic device (or apparatus). For example, by allowing a battery of a wireless user equipment (UE) (or user terminal), such as a smartphone or tablet PC, and so on, to be charged by simply placing the wireless UE on a wireless charging pad the wireless power transmission technology may provide more outstanding mobility, convenience, and safety, as compared to a wired charging environment using a conventional wired charging connector. The wireless power transmission technology is receiving a great deal of attention from various fields, such as consumer electrical appliances, industrial apparatuses, military apparatuses, automobiles, infrastructures, medical appliances, and so on, as a means for replacing the conventional wired power transmitting environment.

As an organization leading the standardization of the wireless power transmission technology, Wireless Power Consortium (WPC) is categorizing a number of groups in accordance with a power amount transmitted and received by electronic devices (or apparatuses and is establishing a standard per group). For example, a first group establishes a standard for low power (approximately 5 W or less or approximately 30 W or less) targeting wearable devices, such as a Smart watch, a Smart Glass, a Head Mounted Display (HMD), and a Smart ring, and mobile electronic devices (or portable electronic devices), such as earphones, a remote controller, a smartphone, a PDA, a tablet PC, and so on. A second group establishes a standard for medium power (approximately 60 W or less or approximately 200 W or less) targeting mid-sized/small-sized electric appliances, such as a laptop computer, a robotic vacuum cleaner, a TV, an audio device, a vacuum cleaner, a monitor, and so on. And, a third group establishes a standard for high power (approximately 2 kW or less or approximately 22 kW or less) targeting kitchen appliances, such as a food processor (i.e., mixer or blender), a microwave oven, and an electric rice cooker, and personal mobile apparatuses (or electronic devices/means of transportation), such as a wheelchair, an electric kickboard, an electric bicycle, an electric car, and so on.

In a power supply method via terminal, as long as a terminal connection is well-established between a charger and a user equipment (UE), the likelihood of the presence (or existence) of an obstacle hindering the charging process is low. Conversely, due to its non-contact charging characteristic, in a wireless power transmitting system, unnecessary foreign object(s) may be inserted between a wireless power receiving apparatus and a wireless power transmitting apparatus. In case a foreign object, such as metal, is located between the wireless power receiving apparatus and the wireless power transmitting apparatus, due to the foreign object, problems of the power transmission failing to be performed easily as well as damage in a product resulting from fire and explosion being caused by an over load and heating of the foreign object. Although various methods for detecting foreign objects are being introduced, in order to resolve the above-described problem(s), due to differences in the individual characteristics of the wireless power receiving apparatus, there may occur a case where the foreign object detection is not performed appropriately. Therefore, an apparatus and method capable of enhancing accuracy and reliability in performing foreign object detection, despite the individual characteristics of the wireless power receiving apparatus,

SUMMARY OF THE DISCLOSURE

Technical Objects

A technical object of the present disclosure is to provide an apparatus and method for performing wireless power transmission based on a foreign object detection before and after the wireless power transmission.

Another technical object of the present disclosure is to provide an optimal Q factor ensuring reliable foreign object detection in a wireless power transmitting system.

Another technical object of the present disclosure is to provide an apparatus and method for performing foreign object detection based on an optimal Q factor in a wireless power transmitting system.

Technical Solutions

According to an embodiment of the present disclosure, provided herein is an apparatus for receiving wireless power from a wireless power transmitting apparatus based on foreign object detection in a wireless power transmitting system. The apparatus may include a power pick-up unit being configured to receive wireless power from the wireless power transmitting apparatus via magnetic coupling with the wireless power transmitting apparatus, and to convert an alternating current (AC) signal being generated from the wireless power to a direct current (DC) signal, a communication/control unit being configured to receive the direct current (DC) signal from the power pick-up unit and to perform control of the wireless power, and a load being configured to receive the direct current (DC) signal from the power pick-up unit, wherein the communication/control unit may transmit a foreign object detection (FOD) status packet including a reported quality factor value to the wireless power transmitting apparatus, and receives ACK/NAK response information as a response to the foreign object detection status packet from the wireless power transmitting apparatus, and wherein the communication/control unit may determine to perform the wireless power transmission under a power transfer contract being limited to 5 W or less, based on the received ACK/NAK response information.

According to an aspect, in case the ACK/NAK response information informs NAK, the communication/control unit may determine to perform the wireless power transmission according to the power transfer contract having the wireless power limited to 5 W or less.

According to another aspect, the power pick-up unit may receive the wireless power being limited to 5 W or less, and the communication/control unit may transmit a received power packet for the received wireless power to the wireless power transmitting apparatus, and the wireless power transmission may be determined in accordance with a foreign object detection (FOD) result based on the received power packet.

According to yet another aspect, the determining based on the ACK/NAK response information may be performed in a negotiation phase.

According to yet another aspect, the reported quality factor value may be equal to or greater than 25.

According to another embodiment of the present disclosure, provided herein is an apparatus for transmitting wireless power to a wireless power receiving apparatus based on foreign object detection in a wireless power transmitting system. The apparatus may include a power conversion unit being configured to transmit wireless power to the wireless power receiving apparatus via magnetic coupling with the wireless power receiving, and a communication/control unit being configured to measure a quality factor value for the wireless power receiving apparatus before transmitting the wireless power to the wireless power receiving apparatus, to receive a foreign object detection (FOD) status packet including a reported quality factor value from the wireless power receiving apparatus, to perform initial foreign object detection based on the measured quality factor value and the reported quality factor value, to transmit ACK/NAK response information for the foreign object detection (FOD) status packet based on a result of performing the initial foreign object detection to the wireless power receiving apparatus, and to determine to perform the wireless power transmission under a power transfer contract having the wireless power limited to 5 W or less.

According to an aspect, in case a foreign object is detected by performing the initial foreign object detection (FOD), the communication/control unit may configure the ACK/NAK response information to NAK, and may control the power conversion unit so as to allow the wireless power transmission to be performed under the power transfer contract having the wireless power limited to 5 W or less.

According to another aspect, the communication/control unit may receive a received power packet for the wireless power transmission being limited to 5 W or less from the wireless power receiving apparatus, may calculate power loss based on the received power packet, may perform additional foreign object detection based on the calculated power loss, and may determine to abort the wireless power transmission in accordance with a result of performing the additional foreign object detection.

According to yet another aspect, the determining to perform the wireless power transmission based on a result of the initial foreign object detection may be performed in a negotiation phase.

According to yet another aspect, the reported quality factor value may be equal to or greater than 25.

4

Effects of the Disclosure

When detecting a foreign object before power transmission, since the wireless power transmission is continued based on a safe baseline power profile (BPP) of 5 W or less, without aborting the power transmission, charging delay may be prevented, and accuracy and reliability of the foreign object detection may be enhanced, despite the individual characteristics of a wireless power receiving apparatus.

BRIEF DESCRIPTION OF THE DRAWINGS

FIG. 3B shows an example of a WPC NDEF in a wireless power transfer system.

FIG. 5 is a state transition diagram for describing a wireless power transfer procedure.

FIG. 6 shows a power control method according to an exemplary embodiment of the present disclosure.

FIG. 9 shows a communication frame structure according to an exemplary embodiment of the present disclosure.

FIG. 10 is a structure of a sync pattern according to an exemplary embodiment of the present disclosure.

FIG. 13 is a block diagram of a FOD status packet according to an embodiment of the present disclosure.

DESCRIPTION OF EXEMPLARY
EMBODIMENTS

The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
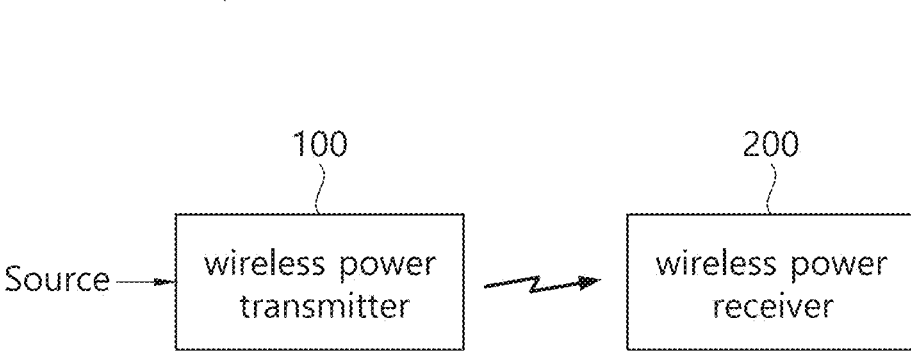
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
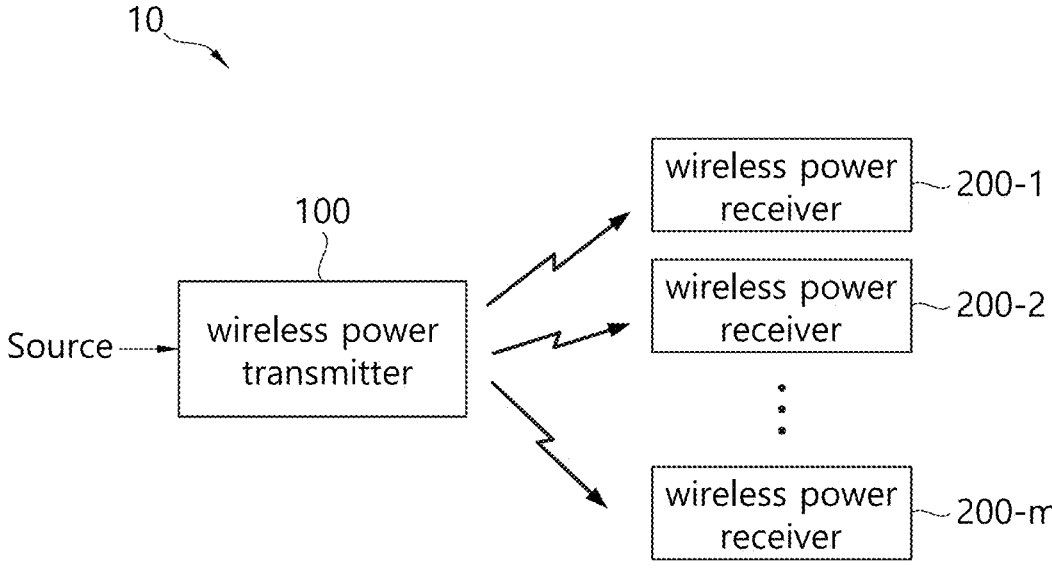
FIG. 2 is a block diagram of a wireless power system (10) according to another exemplary embodiment of the present disclosure.

In the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
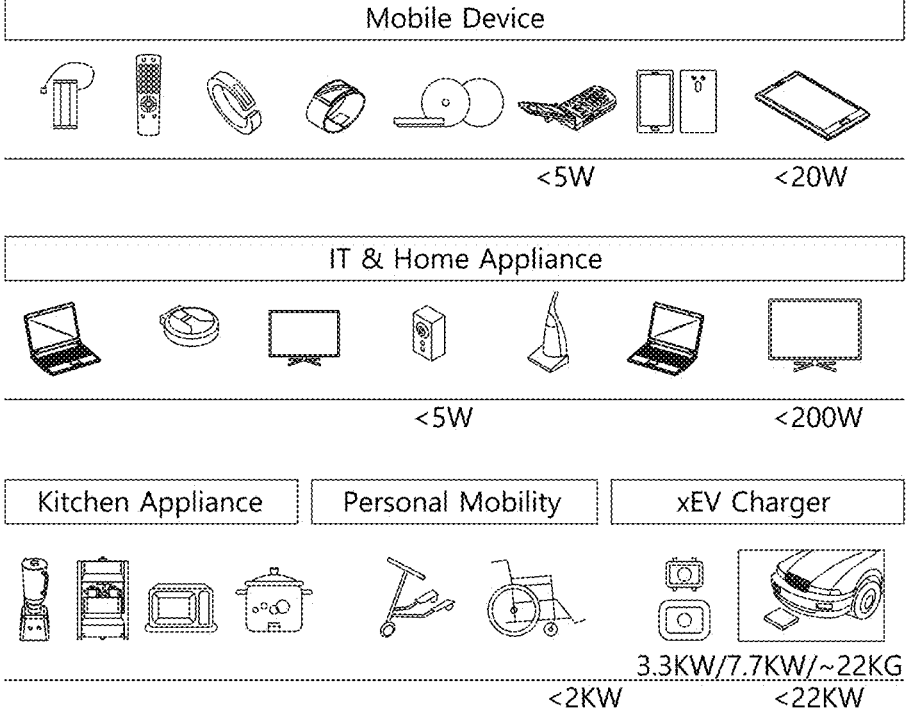
FIG. 3A shows an exemplary embodiment of diverse electronic devices adopting a wireless power transfer system.

FIG. 3A shows an exemplary embodiment of diverse electronic devices adopting a wireless power transfer system.

As shown in FIG. 3A, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user may experience a smart wireless charging service in a hotel. When the user enters a hotel room and puts a smartphone on a wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when it is detected that wireless power is received, or when the smartphone receives information on the smart wireless charging service from the wireless charger, the smartphone enters a state of inquiring the user about agreement (opt-in) of supplemental features. To this end, the smartphone may display a message on a screen in a manner with or without an alarm sound. An example of the message may include the phrase "Welcome to ###hotel. Select "Yes" to activate smart charging functions: Yes|No Thanks." The smartphone receives an input from the user who selects Yes or No Thanks, and performs a next procedure selected by the user. If Yes is selected, the smartphone transmits corresponding information to the wireless charger. The smartphone and the wireless charger perform the smart charging function together.

The smart wireless charging service may also include receiving WiFi credentials auto-filled. For example, the wireless charger transmits the WiFi credentials to the smartphone, and the smartphone automatically inputs the WiFi credentials received from the wireless charger by running an appropriate application.

The smart wireless charging service may also include running a hotel application that provides hotel promotions or obtaining remote check-in/check-out and contact information.

As another example, the user may experience the smart wireless charging service in a vehicle. When the user gets in the vehicle and puts the smartphone on the wireless charger, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about checking identity.

In this state, the smartphone is automatically connected to the vehicle via WiFi and/or Bluetooth. The smartphone may display a message on the screen in a manner with or without an alarm sound. An example of the message may include a phrase of "Welcome to your car. Select "Yes" to synch device with in-car controls: Yes|No Thanks." Upon receiving the user's input to select Yes or No Thanks, the smartphone performs a next procedure selected by the user. If Yes is selected, the smartphone transmits corresponding information to the wireless charger. In addition, the smartphone and the wireless charger may run an in-vehicle smart control function together by driving in-vehicle application/display software. The user may enjoy the desired music and check a regular map location. The in-vehicle applications/display software may include an ability to provide synchronous access for passers-by.

As another example, the user may experience smart wireless charging at home. When the user enters the room and puts the smartphone on the wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about agreement (opt-in) of supplemental features. To this end, the smartphone may display a message on the screen in a manner with or without an alarm sound. An example of the message may include a phrase such as "Hi xxx, Would you like to activate night mode and secure the building?: Yes|No Thanks." The smartphone receives a user input to select Yes or No Thanks and performs a next procedure selected by the user. If Yes is selected, the smartphone transmits corresponding information to the wireless charger. The smartphones and the wireless charger may recognize at least user's pattern and recommend the user to lock doors and windows, turn off lights, or set an alarm.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF). For example, the WPC NDEF may include an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category.

Figure 4A:
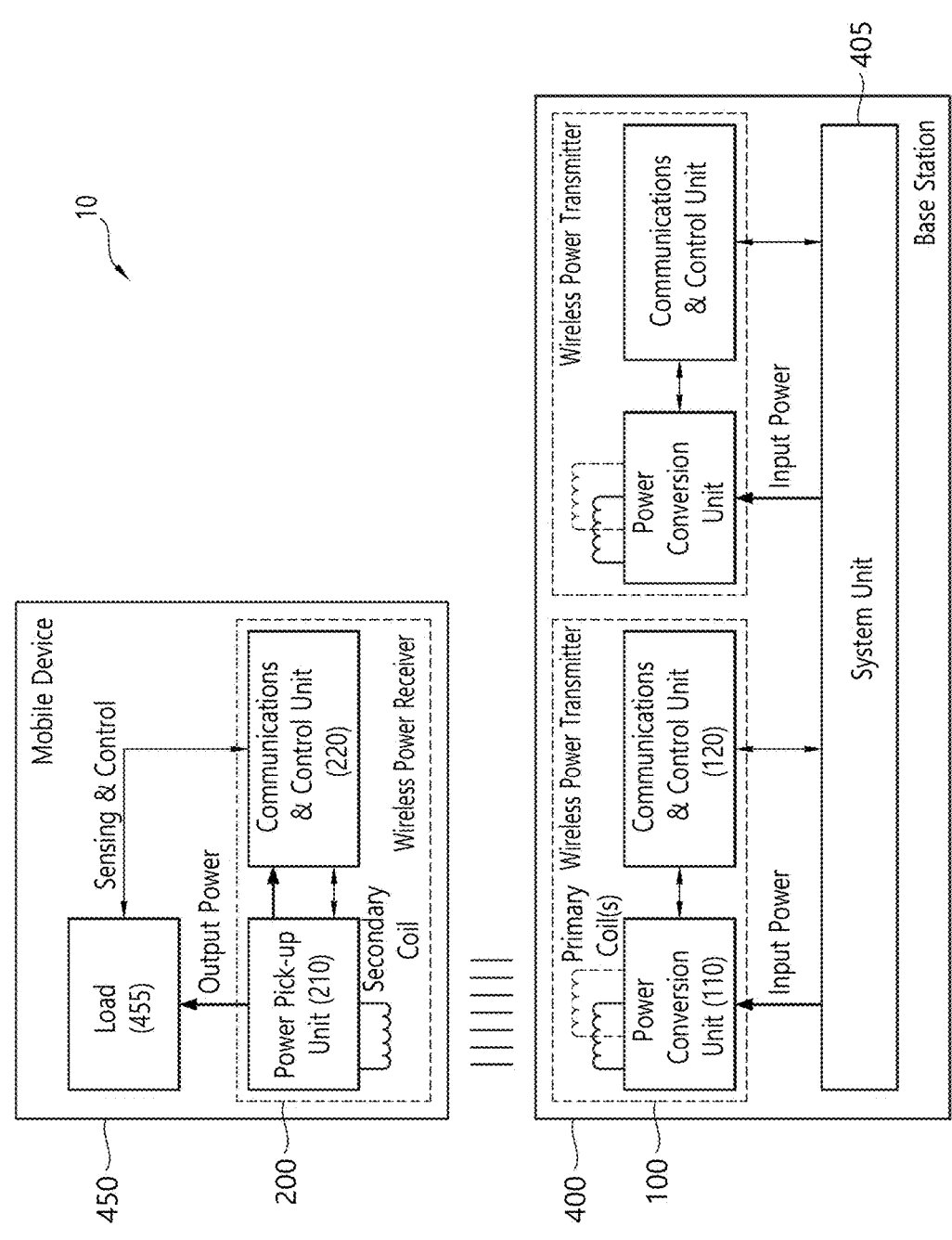
FIG. 4A is a block diagram of a wireless power transfer system according to another exemplary embodiment of the present disclosure.

FIG. 4A is a block diagram of a wireless power transfer system according to another exemplary embodiment of the present disclosure.

Referring to FIG. 4A, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module uses a frequency band different from the operating frequency of the IB, and may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pickup unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4A, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading communication information in the operating frequency used for wireless power transmission and by transmitting the communication information through the secondary coil or by receiving the operating frequency carrying the communication information through the secondary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module uses an operating frequency of wireless power transmission and may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Figure 4B:
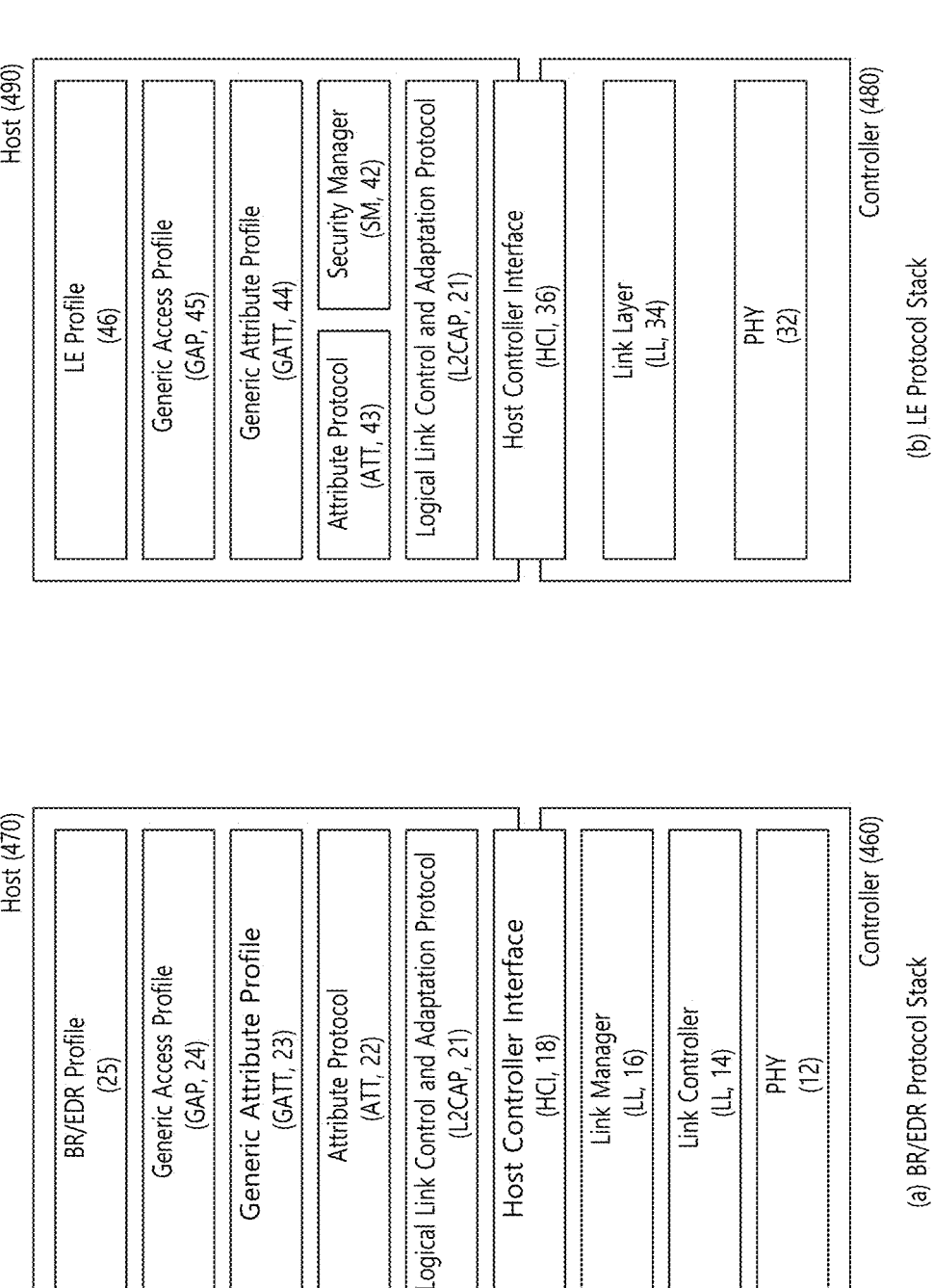
FIG. 4B is a diagram illustrating an example of a Bluetooth communication architecture to which an embodiment according to the present disclosure may be applied.

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 4B.

FIG. 4B is a diagram illustrating an example of a Bluetooth communication architecture to which an embodiment according to the present disclosure may be applied.

Referring to FIG. 4B, (a) of FIG. 4B shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 4B, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.

Performs ACL/SCO logical transport, logical link setup, and control.

Detach: It interrupts connection and informs a counterpart device about a reason for the interruption.

Performs power control and role switch.

Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 4B, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as a part of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

The design directions of a BLE GATT profile in relation with wireless power transmission.

1. A communication physical layer of WPC may be replaced from in-band communication to out-band communication.

2. If BLE is adopted as out-band communication, the BLE GATT profile shall be designed so that required messages in each phase (or step) can be transmitted and received from a WPC state machine.

3. In in-band communication, the longest message is 8 bytes. Based on the characteristics of in-band communication, the bit per see (bps) is low, since the communication performance may not be excellent due to interference, the system may be instable when transmitting and receiving large-sized message at once (i.e., in one session). Relatively, a BLE having a high bps may carry 20 Bytes in a message. Therefore, the required information may be loaded to fit 20 Bytes per phase.

4. Since only the communication physical layer of WPC is transitioned (or shifted) from in-band communication to out-band communication, no change shall be made in a message transmitting/receiving sequence that has used the previously used (or old) in-band communication. Therefore, the design shall be made so that messages can be transmitted and received in a similar way as the WPC state machine.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 4A, The load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 4C:
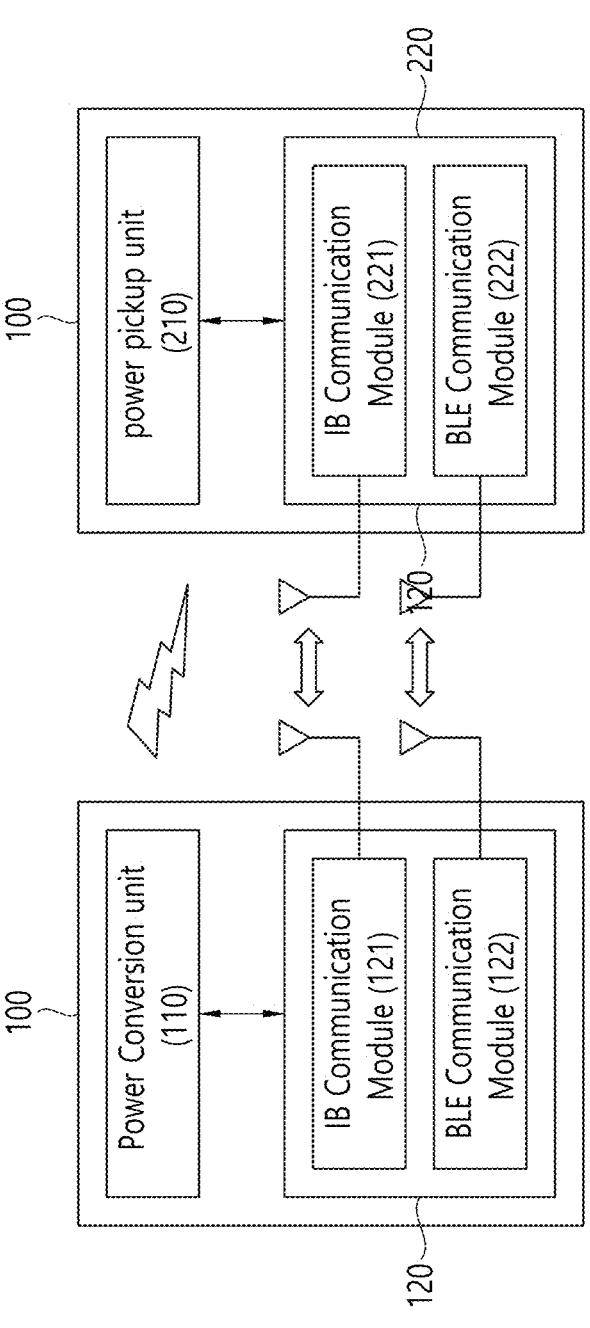
FIG. 4C is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 4C.

FIG. 4C is a block diagram illustrating a wireless power transfer system using BLE communication according to an example.

Referring to FIG. 4C, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 4B. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 4D:
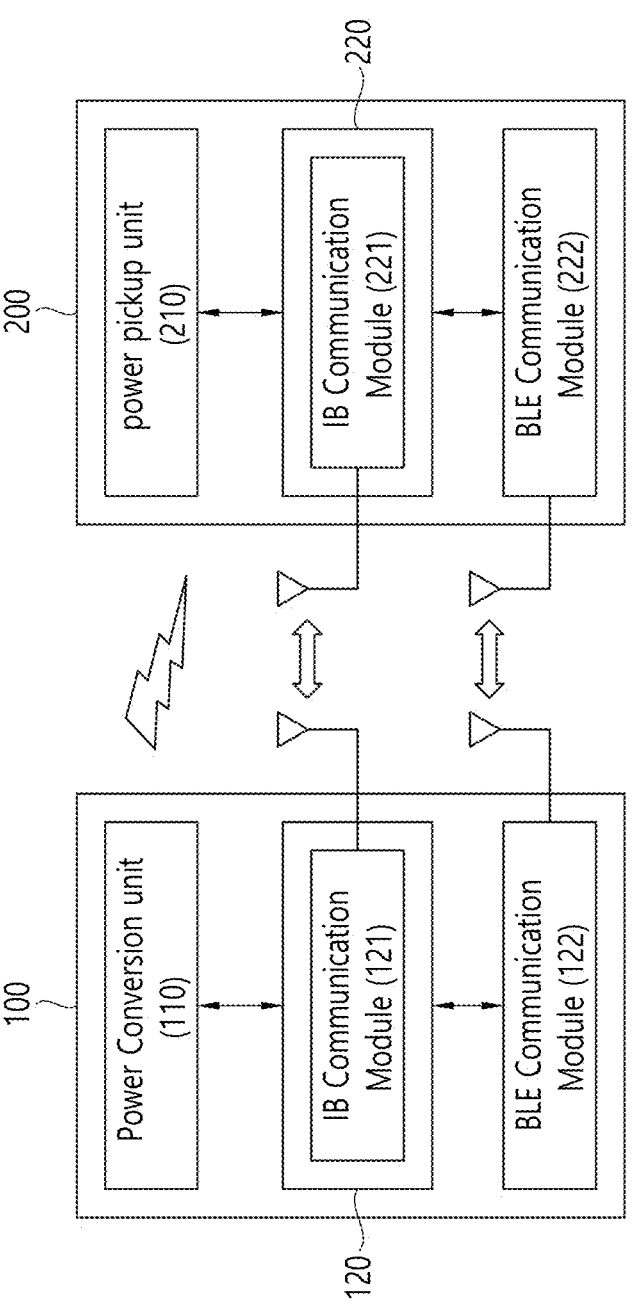
FIG. 4D is a block diagram illustrating a wireless power transfer system using BLE communication according to another example.

Referring to FIG. 4D, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Figure 5:
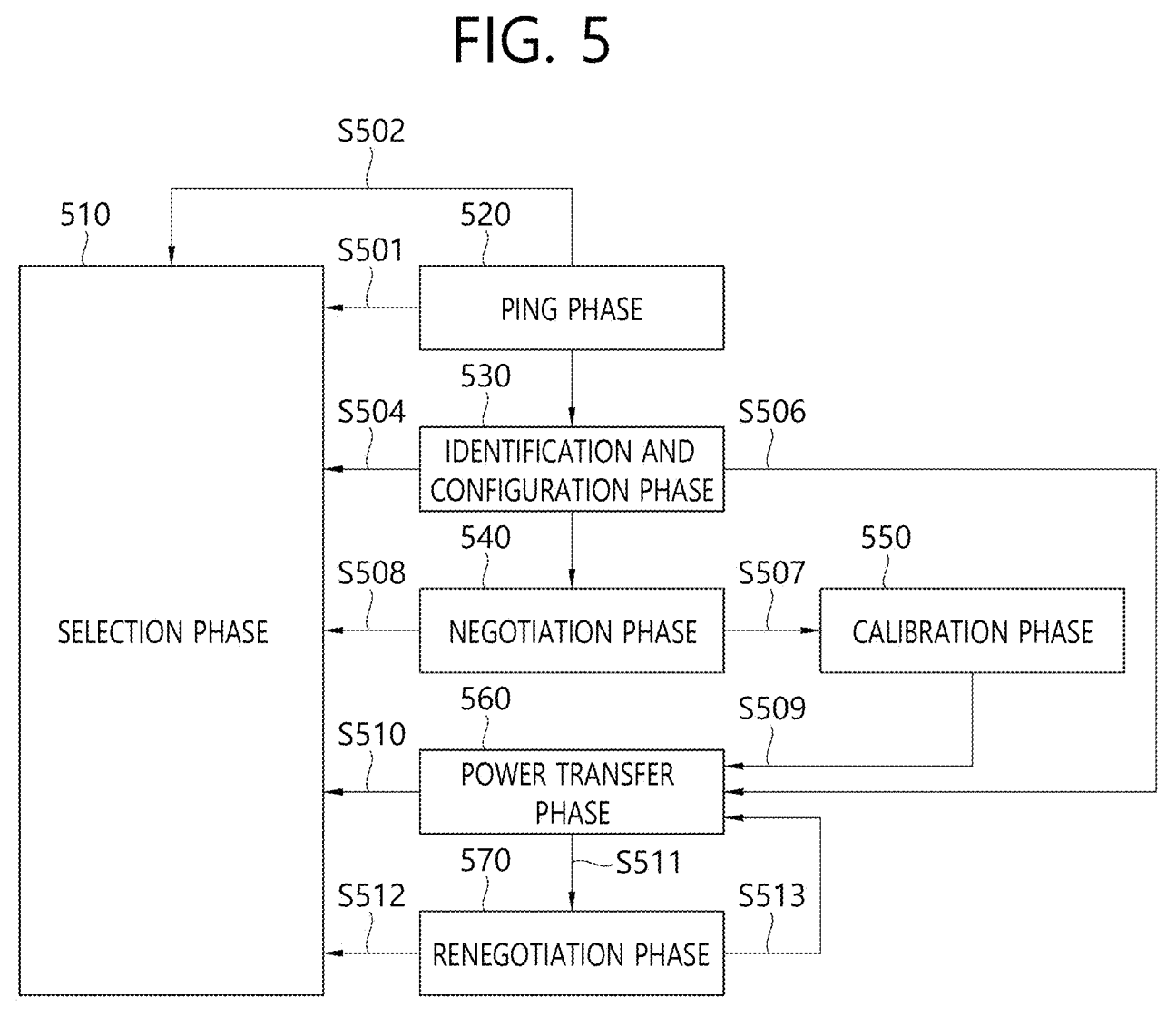

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
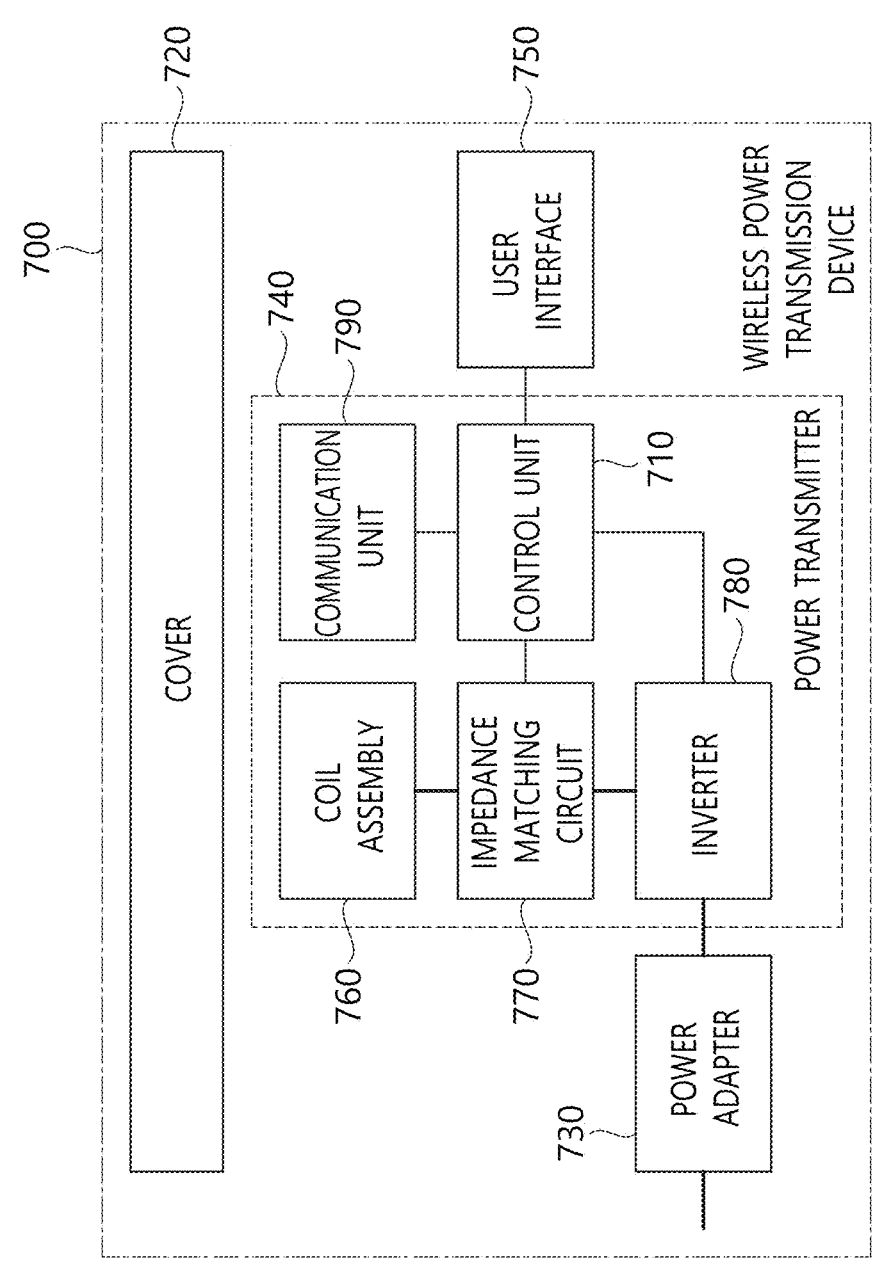
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
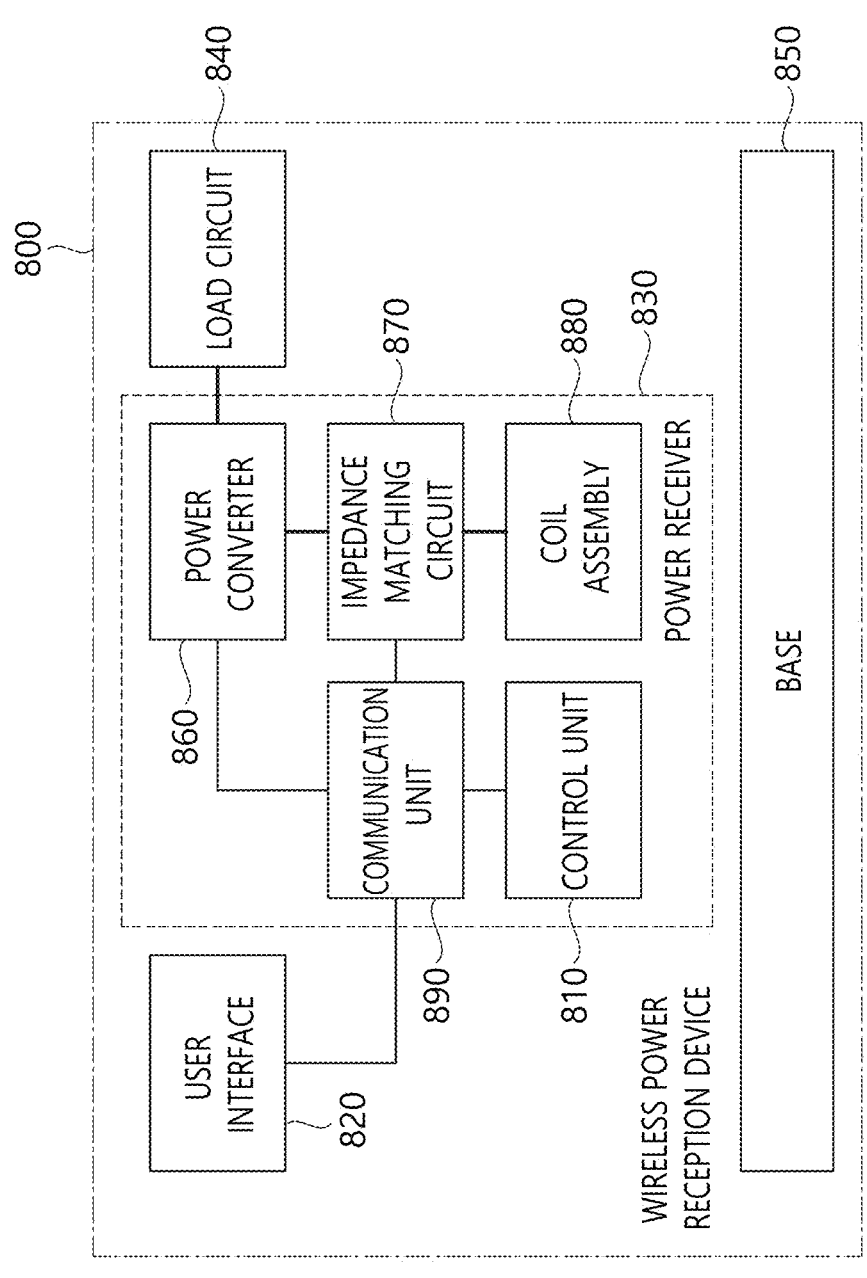
FIG. 8 shows a wireless power receiver according to another exemplary embodiment of the present disclosure.

FIG. 8 shows a wireless power receiver according to another exemplary embodiment of the present disclosure. This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

FIG. 9 shows a communication frame structure according to an exemplary embodiment of the present disclosure. This may correspond to a communication frame structure in a shared mode.

Referring to FIG. 9, in the shared mode, different forms of frames may be used along with one another. For example, in the shared mode, a slotted frame having a plurality of slots, as shown in (A), and a free format frame that does not have a specified format, as shown in (B), may be used. More specifically, the slotted frame corresponds to a frame for transmitting short data packets from the wireless power receiver (200) to the wireless power transmitter (100). And, since the free format frame is not configured of a plurality of slots, the free format frame may correspond to a frame that is capable of performing transmission of long data packets.

Meanwhile, the slotted frame and the free format frame may be referred to other diverse terms by anyone skilled in the art. For example, the slotted frame may be alternatively referred to as a channel frame, and the free format frame may be alternatively referred to as a message frame.

More specifically, the slotted frame may include a sync pattern indicating the starting point (or beginning) of a slot, a measurement slot, nine slots, and additional sync patterns each having the same time interval that precedes each of the nine slots.

Herein, the additional sync pattern corresponds to a sync pattern that is different from the sync pattern that indicates the starting point of the above-described frame. More specifically, the additional sync pattern does not indicate the starting point of the frame but may indicate information related to the neighboring (or adjacent) slots (i.e., two consecutive slots positioned on both sides of the sync pattern).

Among the nine slots, each sync pattern may be positioned between two consecutive slots. In this case, the sync pattern may provide information related to the two consecutive slots.

Additionally, the nine slots and the sync patterns being provided before each of the nine slots may have the same time interval. For example, the nine slots may have a time interval of 50 ms. And, the nine sync patterns may have a time length of 50 ms.

Meanwhile, the free format frame, as shown in (B) may not have a specific format apart from the sync pattern indicating the starting point of the frame and the measurement slot. More specifically, the free format frame is configured to perform a function that is different from that of the slotted frame. For example, the free format frame may be used to perform a function of performing communication of long data packets (e.g., additional owner information packets) between the wireless power transmitter and the wireless power receiver, or, in case of a wireless power transmitter being configured of multiple coils, to perform a function of selecting any one of the coils.

Hereinafter, a sync pattern that is included in each frame will be described in more detail with reference to the accompanying drawings.

FIG. 10 is a structure of a sync pattern according to an exemplary embodiment of the present disclosure.

Referring to FIG. 10, the sync pattern may be configured of a preamble, a start bit, a response field, a type field, an info field, and a parity bit. In FIG. 10, the start bit is illustrated as ZERO.

More specifically, the preamble is configured of consecutive bits, and all of the bits may be set to 0. In other words, the preamble may correspond to bits for matching a time length of the sync pattern.

The number of bits configuring the preamble may be subordinate to the operation frequency so that the length of the sync pattern may be most approximate to 50 ms but within a range that does not exceed 50 ms. For example, in case the operation frequency corresponds to 100 kHz, the sync pattern may be configured of two preamble bits, and, in case the operation frequency corresponds to 105 kHz, the sync pattern may be configured of three preamble bits.

The start bit may correspond to a bit that follows the preamble, and the start bit may indicate ZERO. The ZERO may correspond to a bit that indicates a type of the sync pattern. Herein, the type of sync patterns may include a frame sync including information that is related to a frame, and a slot sync including information of the slot. More specifically, the sync pattern may be positioned between consecutive frames and may correspond to a frame sync that indicate a start of the frame, or the sync pattern may be positioned between consecutive slots among a plurality of slots configuring the frame and may correspond to a sync slot including information related to the consecutive slots.

For example, in case the ZERO is equal to 0, this may indicate that the corresponding slot is a slot sync that is positioned in-between slots. And, in case the ZERO is equal to 1, this may indicate that the corresponding sync pattern is a frame sync being located in-between frames.

A parity bit corresponds to a last bit of the sync pattern, and the parity bit may indicate information on a number of bits configuring the data fields (i.e., the response field, the type field, and the info field) that are included in the sync pattern. For example, in case the number of bits configuring the data fields of the sync pattern corresponds to an even number, the parity bit may be set to when, and, otherwise (i.e., in case the number of bits corresponds to an odd number), the parity bit may be set to 0.

The response field may include response information of the wireless power transmitter for its communication with the wireless power receiver within a slot prior to the sync pattern. For example, in case a communication between the wireless power transmitter and the wireless power receiver is not detected, the response field may have a value of '00'. Additionally, if a communication error is detected in the communication between the wireless power transmitter and the wireless power receiver, the response field may have a value of '01'. The communication error corresponds to a case where two or more wireless power receivers attempt to access one slot, thereby causing collision to occur between the two or more wireless power receivers.

Additionally, the response field may include information indicating whether or not the data packet has been accurately received from the wireless power receiver. More specifically, in case the wireless power transmitter has denied the data packet, the response field may have a value of "10" (10—not acknowledge (NAK)). And, in case the wireless power transmitter has confirmed the data packet, the response field may have a value of "11" (11—acknowledge (ACK)).

The type field may indicate the type of the sync pattern. More specifically, in case the sync pattern corresponds to a first sync pattern of the frame (i.e., as the first sync pattern, in case the sync pattern is positioned before the measurement slot), the type field may have a value of '1', which indicates a frame sync.

Additionally, in a slotted frame, in case the sync pattern does not correspond to the first sync pattern of the frame, the type field may have a value of '0', which indicates a slot sync.

Moreover, the information field may determine the meaning of its value in accordance with the sync pattern type, which is indicated in the type field. For example, in case the type field is equal to 1 (i.e., in case the sync pattern type indicates a frame sync), the meaning of the information field may indicate the frame type. More specifically, the information field may indicate whether the current frame corresponds to a slotted frame or a free-format frame. For example, in case the information field is given a value of '00', this indicates that the current frame corresponds to a slotted frame. And, in case the information field is given a value of '01', this indicates that the current frame corresponds to a free-format frame.

Conversely, in case the type field is equal to 0 (i.e., in case the sync pattern type indicates a slot sync), the information field may indicate a state of a next slot, which is positioned after the sync pattern. More specifically, in case the next slot corresponds to a slot that is allocated (or assigned) to a specific wireless power receiver, the information field is given a value of '00'. In case the next slot corresponds to a slot that is locked, so as to be temporarily used by the specific wireless power receiver, the information field is given a value of '01'. Alternatively, in case the next slot corresponds to a slot that may be freely used by a random wireless power receiver, the information field is given a value of '10'.

Figure 11:
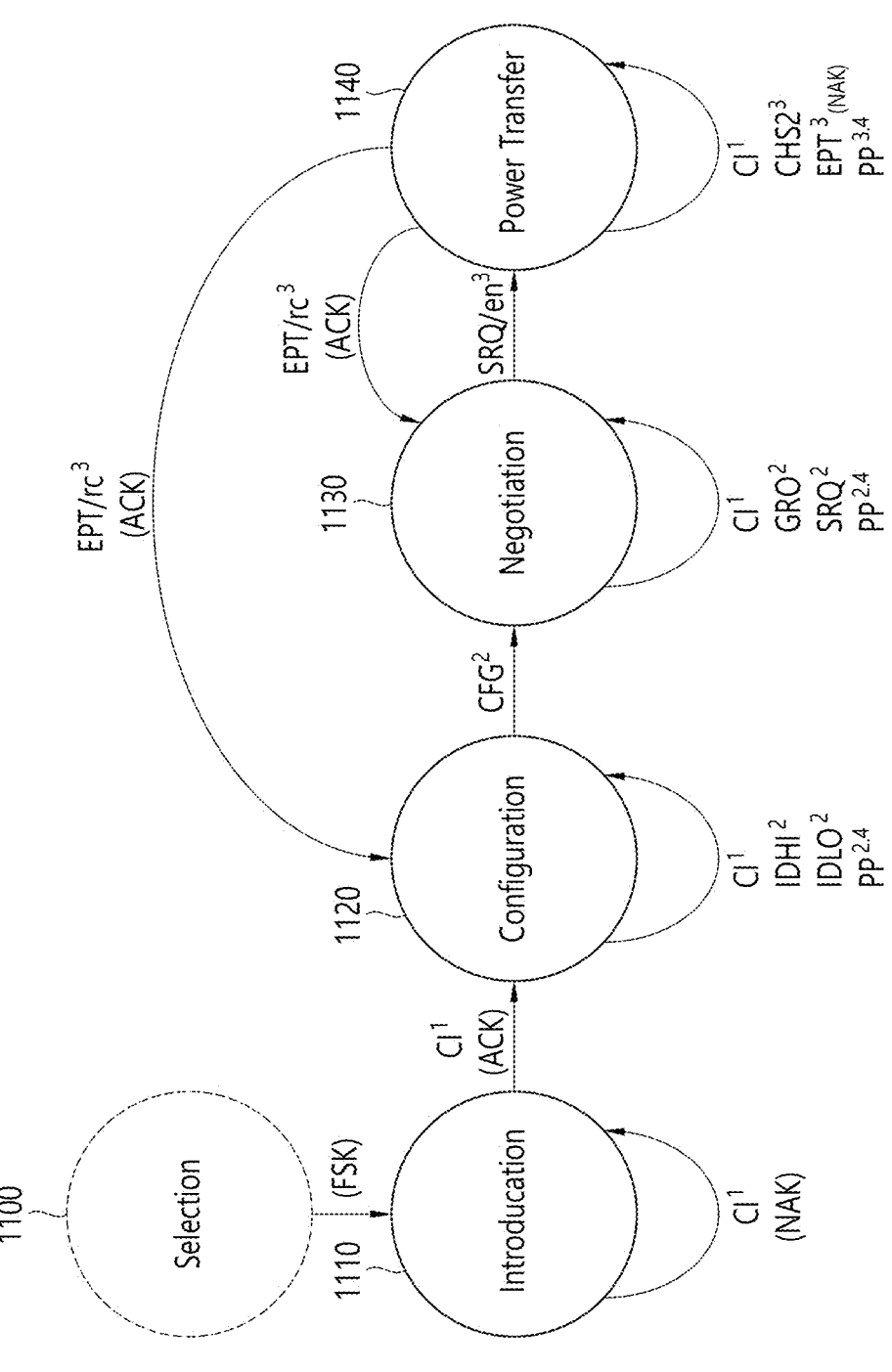
FIG. 11 shows operation statuses of a wireless power transmitter and a wireless power receiver in a shared mode according to an exemplary embodiment of the present disclosure.

FIG. 11 shows operation statuses of a wireless power transmitter and a wireless power receiver in a shared mode according to an exemplary embodiment of the present disclosure.

Referring to FIG. 11, the wireless power receiver operating in the shared mode may be operated in any one of a selection phase (1100), an introduction phase (1110), a configuration phase (1120), a negotiation phase (1130), and a power transfer phase (1140).

Firstly, the wireless power transmitter according to the exemplary embodiment of the present disclosure may transmit a wireless power signal in order to detect the wireless power receiver. More specifically, a process of detecting a wireless power receiver by using the wireless power signal may be referred to as an Analog ping.

Meanwhile, the wireless power receiver that has received the wireless power signal may enter the selection phase (1100). As described above, the wireless power receiver that has entered the selection phase (1100) may detect the presence or absence of an FSK signal within the wireless power signal.

In other words, the wireless power receiver may perform communication by using any one of an exclusive mode and a shared mode in accordance with the presence or absence of the FSK signal.

More specifically, in case the FSK signal is included in the wireless power signal, the wireless power receiver may operate in the shared mode, and, otherwise, the wireless power receiver may operate in the exclusive mode.

In case the wireless power receiver operates in the shared mode, the wireless power receiver may enter the introduction phase (1110). In the introduction phase (1110), the wireless power receiver may transmit a control information (CI) packet to the wireless power transmitter in order to transmit the control information packet during the configuration phase, the negotiation phase, and the power transfer phase. The control information packet may have a header and information related to control. For example, in the control information packet, the header may correspond to 0X53.

In the introduction phase (1110), the wireless power receiver performs an attempt to request a free slot for transmitting the control information (CI) packet during the following configuration phase, negotiation phase, and power transfer phase. At this point, the wireless power receiver selects a free slot and transmits an initial CI packet. If the wireless power transmitter transmits an ACK as a response to the corresponding CI packet, the wireless power receiver enters the configuration phase. If the wireless power transmitter transmits a NAK as a response to the corresponding CI packet, this indicates that another wireless power receiver is performing communication through the configuration and negotiation phase. In this case, the wireless power receiver re-attempts to perform a request for a free slot.

If the wireless power receiver receives an ACK as a response to the CI packet, the wireless power receiver may determine the position of a private slot within the frame by counting the remaining sync slots up to the initial frame sync. In all of the subsequent slot-based frames, the wireless power receiver transmits the CI packet through the corresponding slot.

If the wireless power transmitter authorizes the entry of the wireless power receiver to the configuration phase, the wireless power transmitter provides a locked slot series for the exclusive usage of the wireless power receiver. This may ensure the wireless power receiver to proceed to the configuration phase without any collision.

The wireless power receiver transmits sequences of data packets, such as two identification data packets (IDHI and IDLO), by using the locked slots. When this phase is completed, the wireless power receiver enters the negotiation phase. During the negotiation state, the wireless power transmitter continues to provide the locked slots for the exclusive usage of the wireless power receiver. This may ensure the wireless power receiver to proceed to the negotiation phase without any collision.

The wireless power receiver transmits one or more negotiation data packets by using the corresponding locked slot, and the transmitted negotiation data packet(s) may be mixed with the private data packets. Eventually, the corresponding sequence is ended (or completed) along with a specific request (SRQ) packet. When the corresponding sequence is completed, the wireless power receiver enters the power transfer phase, and the wireless power transmitter stops the provision of the locked slots.

In the power transfer phase, the wireless power receiver performs the transmission of a CI packet by using the allocated slots and then receives the power. The wireless power receiver may include a regulator circuit. The regulator circuit may be included in a communication/control unit. The wireless power receiver may self-regulate a reflected impedance of the wireless power receiver through the regulator circuit. In other words, the wireless power receiver may adjust the impedance that is being reflected for an amount of power that is requested by an external load. This may prevent an excessive reception of power and overheating.

In the shared mode, (depending upon the operation mode) since the wireless power transmitter may not perform the adjustment of power as a response to the received CI packet, in this case, control may be needed in order to prevent an overvoltage state.

Hereinafter, a wireless power transmitting apparatus and method, and a wireless power receiving apparatus and method performing foreign object detection before power transmission and determining a power transmission protocol or a level of wireless power that is to be transmitted/received, or a power transfer contract based on a result of the foreign object will be disclosed.

A foreign object may be detected by using various methods. A wireless power transmitting apparatus and/or receiving apparatus may perform foreign object detection during a power transmission phase and may also perform foreign object detection before the power transmission phase. Most particularly, in case of an extended power profile (EPP) or a medium power wireless power receiving apparatus, which consumes a relatively large amount of power, a function capable of performing foreign object detection during the power transmission phase as well as before the power transmission phase is needed. That is, foreign object may be detected during a negotiation phase, which is before the power transmission phase.

For this, when the wireless power receiving apparatus transmits a reported quality factor (Q-factor) value to the wireless power transmitting apparatus, the wireless power transmitting apparatus may use the reported Q-factor value so as to determine whether or not a foreign object exists on an interface surface of the wireless power transmitting apparatus. Herein, the reported Q-factor value may also be referred to as a reference Q-factor.

Figure 12:
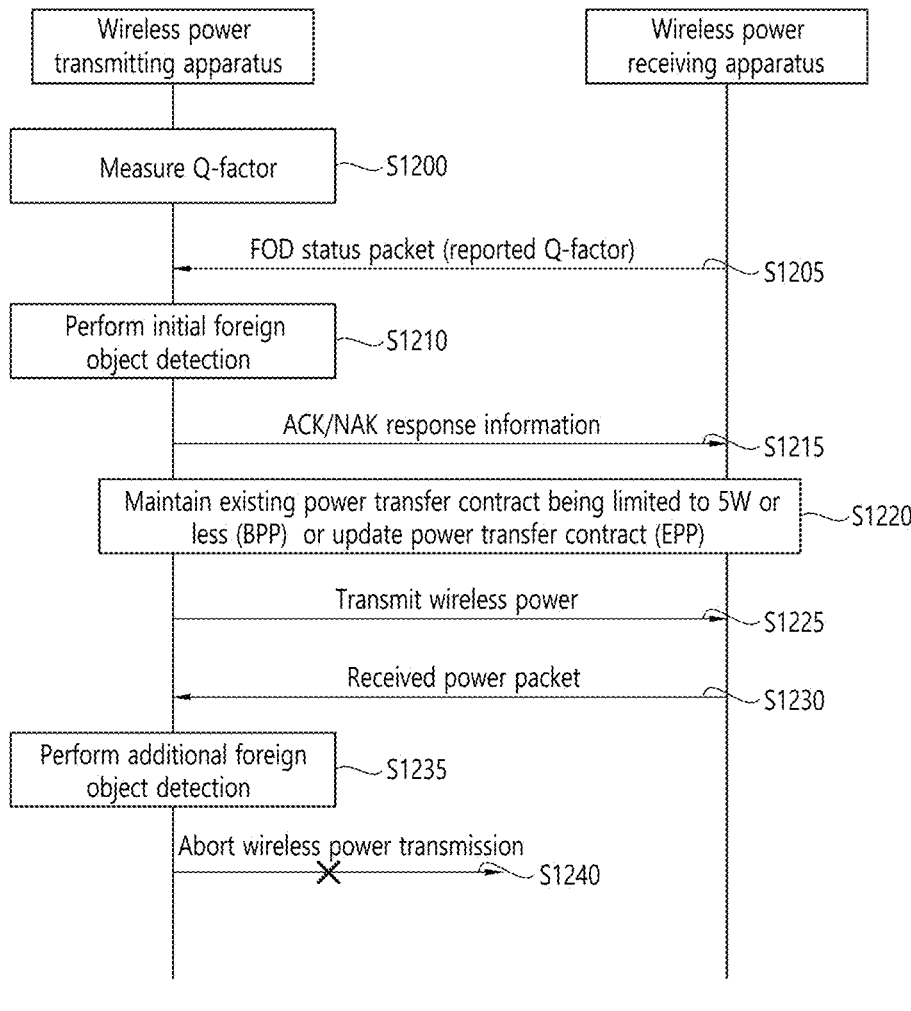
FIG. 12 is a flow chart showing a method for performing foreign object detection before power transmission according to an embodiment of the present disclosure.

FIG. 12 is a flow chart showing a method for performing foreign object detection before power transmission according to an embodiment of the present disclosure.

Referring to FIG. 12, when a communication/control unit of a wireless power transmitting apparatus detects an object (i.e., a wireless power receiving apparatus), the communication/control unit measures a Q-factor value in order to determine whether or not the wireless power receiving apparatus is placed (or positioned) with a foreign object within a charging area (S1200). If an object is detected, inductance and/or series resistance component may be changed in a primary coil, which is provided in the wireless power transmitting apparatus, due to a change in environment. And, due to such change, the Q-factor value decreases.

In order to determine whether or not a foreign object exists by using the measured Q-factor value, the wireless power transmitting apparatus shall know a Q-factor value, which is measured in advance, in a state where the foreign object has not been placed (or positioned) in the charging area. This value is referred to as a reported Q-factor value or a reference Q-factor value. That is, a communication/control unit of the wireless power receiving apparatus transmits an FOD status packet including the reported Q-factor value to the wireless power transmitting apparatus, and the communication/control unit of the wireless power transmitting apparatus receives the FOD status packet (S1205). The transmission or reception of the FOD status packet may be performed during the negotiation phase (540).

FIG. 13 is a block diagram of a FOD status packet according to an embodiment of the present disclosure.

Referring to FIG. 13, for example, the FOD status packet may be configured of 2 bytes (B1, B2). Herein, a first byte (B1) may include a 6-bit reserved field and a 2-bit type field. The type field may indicate a type of FOD support data included in the second byte (B2). For example, the type field may indicate two types: FOD/qf and FOD/rf. Herein, FOD/qf indicates a reported Q-factor value in which the second byte is used for the foreign object detection, and FOD/rf indicates a resonance frequency in which the second byte is used for the foreign object detection.

Referring back to FIG. 12, the communication/control unit of the wireless power transmitting apparatus performs initial foreign object detection based on a measured Q-factor value and a reported Q-factor value (S1210). Since step S1210 is performed before performing power transmission, this phase may also be referred to as foreign object detection prior to power transmission (or foreign object detection before power transmission). For example, the initial foreign object detection includes an operation of determining the presence or absence of a foreign object by comparing the measured Q-factor value and the reported Q-factor value.

A result of performing the initial foreign object detection leads to two subsequent operations. Firstly, according to the result of performing the initial foreign object detection, the communication/control unit of the wireless power transmitting apparatus transmits ACK/NACK response information corresponding to the FOD status packet. And, secondly, according to the result of performing the initial foreign object detection, the communication/control unit of the wireless power transmitting apparatus controls power transmission and protocol.

Firstly, based on the result of performing the initial foreign object detection, the communication/control unit of the wireless power transmitting apparatus transmits ACK/NACK response information corresponding to the FOD status packet to the wireless power receiving apparatus, and the communication/control unit of the wireless power receiving apparatus receives the ACK/NACK response information (S1215). The ACK/NACK response information may, for example, be a specific bit pattern and may be transmitted by an FSK scheme. Thereafter, based on the result of performing the initial foreign object detection, the communication/control unit of the wireless power receiving apparatus maintains the existing power transfer contract (BPP), which is limited to 5 W or less, or updates the power transfer contract (EPP) (S1220).

For example, in case a foreign object is detected by performing the initial foreign object detection, the communication/control unit of the wireless power transmitting apparatus configures the ACK/NACK response information to NAK and transmits the corresponding information to the wireless power receiving apparatus. Thereafter, the communication/control unit of the wireless power transmitting apparatus determines a wireless power transmission under a power transfer contract, wherein the wireless power is limited to 5 W or less, and then determines or controls a transmission power level, a power transfer contract and protocol of a power conversion unit of the wireless power transmitting apparatus, accordingly (S1220). More specifically, the communication/control unit of the wireless power transmitting apparatus aborts the negotiation phase and uses the existing power transfer contract and a baseline protocol (or baseline power profile (BPP)). Then, the power conversion unit of the wireless power transmitting apparatus transmits wireless power of 5 W or less to the wireless power receiving apparatus via magnetic coupling with the wireless power receiving apparatus (S1225). Therefore, when a foreign object is detected before the power transmission, since the power transmission is not aborted and the wireless power transmission is continued based on a baseline power profile (BPP) of 5 W or less, charging abortion (or suspension) may be prevented, and, while performing charging, the transmitting apparatus may perform foreign object detection by using power transmission loss.

As for the wireless power receiving apparatus, in case the received ACK/NACK response information indicates NAK, the communication/control unit of the wireless power receiving apparatus may control a power pick-up unit of the wireless power receiving apparatus so that the wireless power reception can be performed according to the power transfer contract, wherein the wireless power can be limited to 5 W or less. More specifically, the communication/control unit of the wireless power receiving apparatus aborts the negotiation phase and uses the existing power transfer contract and the baseline protocol (or baseline power profile (BPP)). The power pick-up unit of the wireless power receiving apparatus receives wireless power from the wireless power transmitting apparatus via magnetic coupling with the wireless power transmitting device according to the existing power transfer contract.

In another example, in case a foreign object is not detected by performing the initial foreign object detection, the communication/control unit of the wireless power transmitting apparatus configures the ACK/NACK response information to ACK and transmits the corresponding information to the wireless power receiving apparatus. Thereafter, the communication/control unit of the wireless power transmitting apparatus determines a wireless power transmission under a power transfer contract, which is updated during the negotiation phase, and then determines or controls a transmission power level, a power transfer contract and protocol of a power conversion unit of the wireless power transmitting apparatus, accordingly (S1220). More specifically, the communication/control unit of the wireless power transmitting apparatus completes the negotiation phase and uses the updated power transfer contract and an extended protocol (or extended power profile (EPP)). Then, the power conversion unit of the wireless power transmitting apparatus transmits wireless power to the wireless power receiving apparatus via magnetic coupling with the wireless power receiving apparatus according to the required power (S1225).

As for the wireless power receiving apparatus, in case the received ACK/NACK response information indicates ACK, the communication/control unit of the wireless power receiving apparatus may control the power pick-up unit of the wireless power receiving apparatus so that the wireless power reception can be performed according to the power transfer contract, which is updated during the negotiation phase. More specifically, the communication/control unit of the wireless power receiving apparatus completes the negotiation phase and uses the updated power transfer contract and the extended protocol (or extended power profile (EPP)). Thereafter, the power pick-up unit of the wireless power receiving apparatus receives wireless power from the wireless power transmitting apparatus via magnetic coupling with the wireless power transmitting device according to the updated power transfer contract.

The process starting from step S1225 corresponds to a power transmission phase. And, the wireless power, which is transmitted by the power conversion unit of the wireless power transmitting apparatus during the power transmission phase, may be received by the power pick-up unit of the wireless power receiving apparatus.

The communication/control unit of the wireless power receiving apparatus transmits a received power packet indicating a received power value to the wireless power transmitting apparatus (S1230). The received power packet may be used for additional foreign object detection being based on power loss. The communication/control unit of the wireless power transmitting apparatus calculates power loss based on the transmitted wireless power and the received power packet and performs additional foreign object detection based on the calculated power loss (S1235). If a foreign object is detected by performing the additional foreign object detection, the power conversion unit of the wireless power transmitting apparatus may abort the transmission of the wireless power (S1240).

Meanwhile, a foreign object detection performance may be influenced by the reported Q-factor value. If the reported Q-factor value is less than 50, the wireless power transmitting apparatus cannot maintain accuracy in the foreign object detection using the Q-value factor.

Meanwhile, in case of a wireless power receiving apparatus having a low reported Q-factor value—herein, for example, the wireless power receiving apparatus may have a low reported Q-factor value in accordance with a method for designing a type, purpose, and characteristic, and so on, of a wireless power receiving apparatus, in case a foreign object exists, since there is no significant difference between the measured Q-factor value and the reported Q-factor value, a problem may occur in that the wireless power transmitting apparatus may have difficulty in determining the presence or absence of a foreign object before performing power transmission. This is because the wireless power receiving apparatus may be designed to include a friendly metal (e.g., a metal case).

Upon performing an experiment obtaining a minimum reported Q-factor value, which should be provided to a wireless power receiving apparatus, by using 4 types of reference foreign objects (RFOs), which are proposed in the WPC standard for testing purposes, results of the experiment show that it is preferable for a wireless power receiving apparatus to have a Q-factor value equal to or above a threshold Q-factor value (e.g., a minimum value of 25).

However, according to its method of design, in case an actual wireless power receiving apparatus has a Q-factor value being equal to or greater than 25, and since there may also exist a case where the reported Q-factor value is less than 25, this specification proposes a control procedure of foreign object detection and power transmission according to two different cases.

Figure 14:
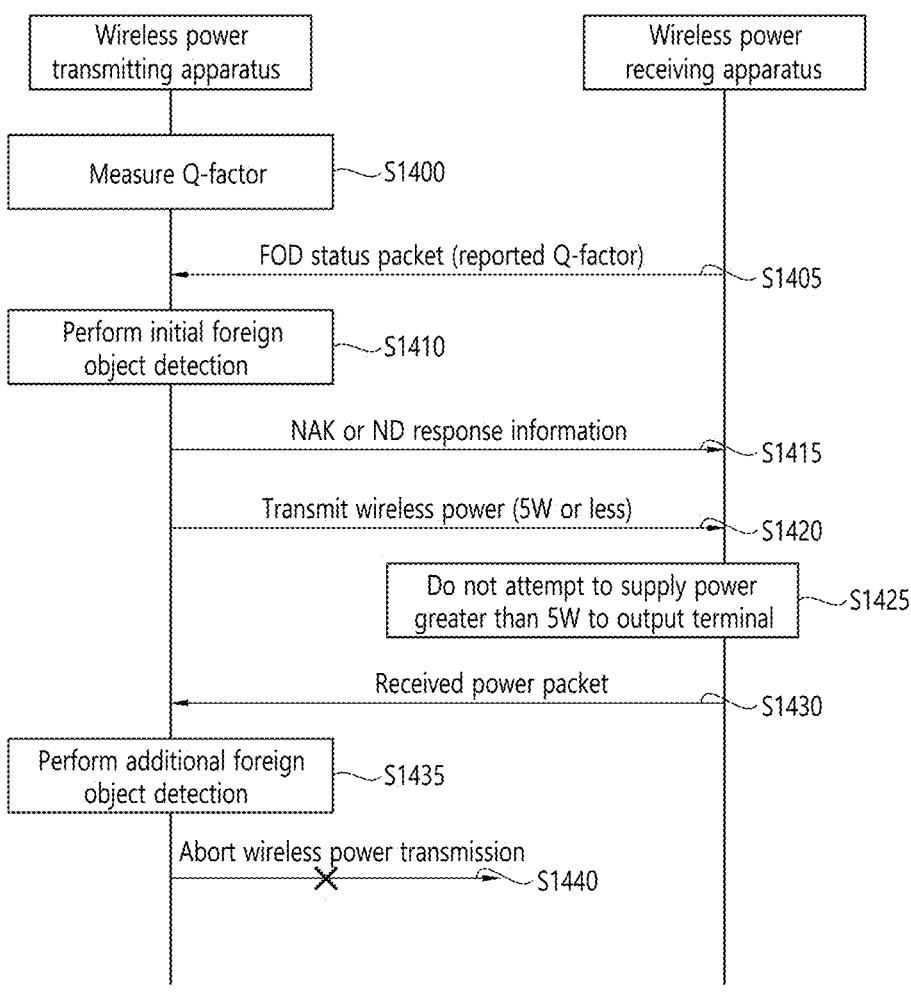
FIG. 14 is a flow chart showing a method for performing foreign object detection before power transmission according to another embodiment of the present disclosure.

FIG. 14 is a flow chart showing a method for performing foreign object detection before power transmission according to another embodiment of the present disclosure. This is a case where the reported Q-factor value is equal to or greater than 25.

Referring to FIG. 14, when a communication/control unit of a wireless power transmitting apparatus detects an object (i.e., a wireless power receiving apparatus), the communication/control unit measures a Q-factor value in order to determine whether or not the wireless power receiving apparatus is placed (or positioned) with a foreign object within a charging area (S1400).

A communication/control unit of the wireless power receiving apparatus transmits an FOD status packet including the reported Q-factor value to the wireless power transmitting apparatus, and the communication/control unit of the wireless power transmitting apparatus receives the FOD status packet (S1405). The transmission or reception of the FOD status packet may be performed during the negotiation phase (540). Herein, the reported Q-factor value is equal to or greater than 25.

The communication/control unit of the wireless power transmitting apparatus performs initial foreign object detection based on a measured Q-factor value and a reported Q-factor value (S1410). Since step S1410 is performed before performing power transmission, this phase may also be referred to as foreign object detection prior to power transmission (or foreign object detection before power transmission). For example, the initial foreign object detection includes an operation of determining the presence or absence of a foreign object by comparing the measured Q-factor value and the reported Q-factor value.

A result of performing the initial foreign object detection leads to two subsequent operations. Firstly, according to the result of performing the initial foreign object detection, the communication/control unit of the wireless power transmitting apparatus transmits ACK/NACK response information corresponding to the FOD status packet. And, secondly, according to the result of performing the initial foreign object detection, the communication/control unit of the wireless power transmitting apparatus controls power transmission and protocol.

Firstly, based on the result of performing the initial foreign object detection, the communication/control unit of the wireless power transmitting apparatus transmits NAK or ND response information corresponding to the FOD status packet to the wireless power receiving apparatus, and the communication/control unit of the wireless power receiving apparatus receives the NAK or ND response information (S1415).

The communication/control unit of the wireless power transmitting apparatus controls a power conversion unit so that the power conversion unit can transmit wireless power of 5 W or less based on the power transfer contract (S1420).

And, the communication/control unit of the wireless power receiving apparatus, which has received the NAK or ND response information, does not attempt to supply high-level power being greater than 5 W to an output terminal until a power signal is removed (e.g., within 5 seconds) (S1425). In other words, the communication/control unit of the wireless power receiving apparatus, which has received the NAK or ND response information, may attempt to supply power of only up to 5 W or less to the output terminal.

The process starting from step S1420 corresponds to a power transmission phase. And, the wireless power, which is transmitted by the power conversion unit of the wireless power transmitting apparatus during the power transmission phase, may be received by the power pick-up unit of the wireless power receiving apparatus.

The communication/control unit of the wireless power receiving apparatus transmits a received power packet indicating a received power value to the wireless power transmitting apparatus (S1430). The received power packet may be used for additional foreign object detection being based on power loss. The communication/control unit of the wireless power transmitting apparatus calculates power loss based on the transmitted wireless power and the received power packet and performs additional foreign object detection based on the calculated power loss (S1435). If a foreign object is detected by performing the additional foreign object detection, the power conversion unit of the wireless power transmitting apparatus may abort the transmission of the wireless power (S1440).

Figure 15:
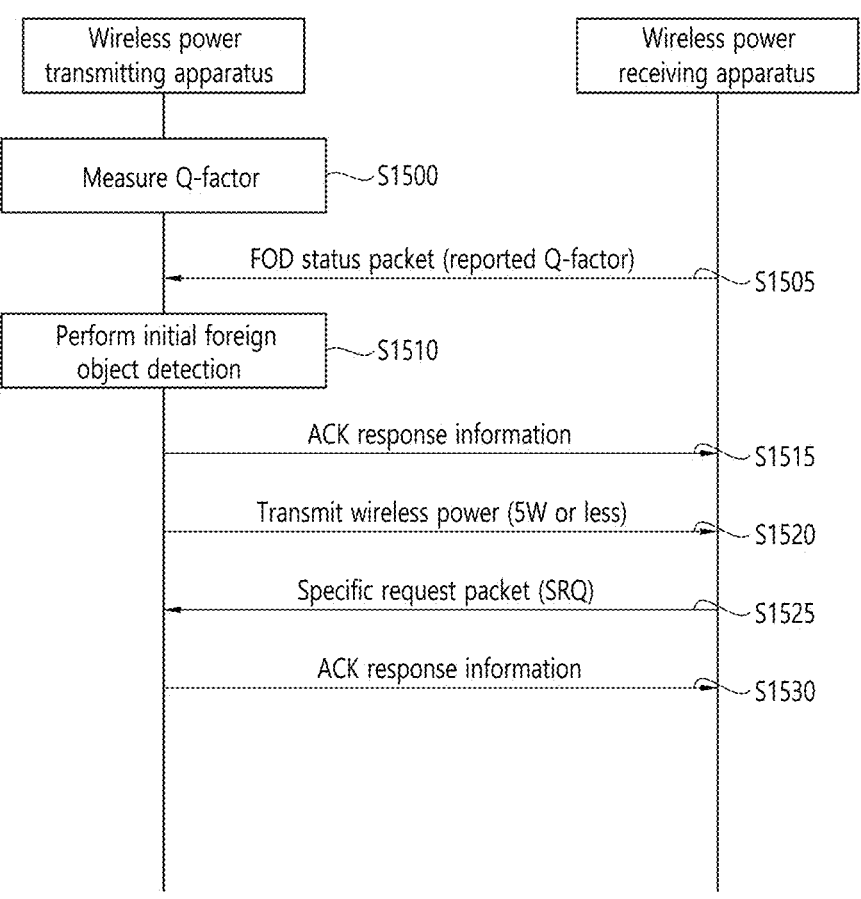
FIG. 15 is a flow chart showing a method for performing foreign object detection before power transmission according to yet another embodiment of the present disclosure.

FIG. 15 is a flow chart showing a method for performing foreign object detection before power transmission according to yet another embodiment of the present disclosure.

Firstly, in case a communication/control unit of a wireless power transmitting apparatus transmits NAK or ND response information as a response to an FOD status packet, the wireless power transmitting apparatus and the wireless power receiving apparatus perform the same steps S1400 to S1440, which are described above in the embodiment where the reported Q-factor value is equal to or greater than 25. Therefore, in FIG. 15, a case where a communication/control unit of a wireless power transmitting apparatus transmits ACK response information as a response to an FOD status packet, will be described in more detail.

When a communication/control unit of a wireless power transmitting apparatus detects an object (i.e., a wireless power receiving apparatus), the communication/control unit measures a Q-factor value in order to determine whether or not the wireless power receiving apparatus is placed (or positioned) with a foreign object within a charging area (S1500).

A communication/control unit of the wireless power receiving apparatus transmits an FOD status packet including the reported Q-factor value to the wireless power transmitting apparatus, and the communication/control unit of the wireless power transmitting apparatus receives the FOD status packet (S1505).

The communication/control unit of the wireless power transmitting apparatus performs initial foreign object detection based on a measured Q-factor value and a reported Q-factor value (S1510).

Based on the result of performing the initial foreign object detection, the communication/control unit of the wireless power transmitting apparatus transmits ACK response information corresponding to the FOD status packet to the wireless power receiving apparatus, and the communication/control unit of the wireless power receiving apparatus receives the ACK response information (S1515).

As described above, when the communication/control unit of the wireless power transmitting apparatus has transmitted the ACK response information, the communication/control unit of the wireless power transmitting apparatus may limit its guaranteed power (GP) to 5 W in order to allow the power transfer contract of only 5 W (S1520).

The communication/control unit of the wireless power receiving apparatus transmits a specific request packet (SRQ) indicating a specific request power value to the wireless power transmitting apparatus (S1525). At this point, the communication/control unit of the wireless power transmitting apparatus transmits ACK response information as a response to the SRQ only when the communication/control unit has received the specific request packet (SRQ) indicating the specific request power value of 5 W or less than 5 W (S1530). By doing so, in case the reported Q-factor value of the wireless power receiving apparatus is less than 25, even if the wireless power receiving apparatus requests a higher guaranteed power (GP) during a re-negotiation phase, the wireless power transmitting apparatus (supporting EPP) may maintain the power transfer contract of 5 W.

Meanwhile, the subsequent power transmission phase may be performed the same as step S1430 to step S1440.

Since the wireless power transmitting method and apparatus or the wireless power receiver and method according to an embodiment of the present disclosure do not necessarily include all the elements or operations, the wireless power transmitter and method and the wireless power transmitter and method may be performed with the above-mentioned components or some or all of the operations. Also, embodiments of the above-described wireless power transmitter and method, or receiving apparatus and method may be performed in combination with each other. Also, each element or operation described above is necessarily performed in the order as described, and an operation described later may be performed prior to an operation described earlier.

The description above is merely illustrating the technical spirit of the present disclosure, and various changes and modifications may be made by those skilled in the art without departing from the essential characteristics of the present disclosure. Therefore, the embodiments of the present disclosure described above may be implemented separately or in combination with each other.

Therefore, the embodiments disclosed in the present disclosure are intended to illustrate rather than limit the scope of the present disclosure, and the scope of the technical spirit of the present disclosure is not limited by these embodiments. The scope of the present disclosure should be construed by claims below, and all technical spirits within a range equivalent to claims should be construed as being included in the right scope of the present disclosure.

What is claimed is:

1. A method in a wireless power transmitting system, the method performed by a wireless power receiver and comprising:

receiving a digital ping from a wireless power transmitter;

transmitting a signal strength packet in response to the digital ping to the wireless power transmitter;

transmitting, to the wireless power transmitter, a foreign object detection (FOD) status packet, wherein the FOD status packet includes a type field having a length of 2 bits, wherein the FOD status packet includes a quality factor value based on the type field having a first value, and the quality factor value is equal to or greater than 25, wherein the FOD status packet includes a resonance frequency value based on the type field having a second value; and receiving, from the wireless power transmitter, ACK/NAK response information as a response to the FOD status packet, wherein, based on the ACK/NAK response information informing NAK, the wireless power receiver switches to a power transfer phase of a baseline protocol.

2. The method of claim 1, wherein the FOD status packet is transmitted during a negotiation phase.

3. The method of claim 1, wherein the ACK/NACK response information is received during a negotiation phase.

4. The method of claim 1, wherein wireless power received by the wireless power receiver from the wireless power transmitter is limited to 5 W or less in the baseline protocol.

5. A wireless power receiver comprising:

a power pickup configured to receive wireless power from a wireless power transmitter; and a communicator/controller configured to communicate with the wireless power transmitter and control reception of the wireless power, wherein the wireless power receiver is configured to:

receive a digital ping from the wireless power transmitter;

transmit a signal strength packet in response to the digital ping to the wireless power transmitter;

transmit, to the wireless power transmitter, a foreign object detection (FOD) status packet, wherein the FOD status packet includes a type field having a length of 2 bits, wherein the FOD status packet includes a quality factor value based on the type field having a first value, and the quality factor value is equal to or greater than 25, wherein the FOD status packet includes a resonance frequency value based on the type field having a second value; and receive, from the wireless power transmitter, ACK/NAK response information as a response to the FOD status packet, wherein, based on the ACK/NAK response information informing NAK, the wireless power receiver switches to a power transfer phase of a baseline protocol.

* * * * *